Oct. 10, 1961

A. SCHINDEL 3,003,835

SEAL FOR GREASE LUBRICATED BEARING

Filed June 30, 1958

INVENTOR.
ARNOLD SCHINDEL

BY Robert W. Ely

ATTORNEY

United States Patent Office 3,003,835
Patented Oct. 10, 1961

3,003,835
SEAL FOR GREASE LUBRICATED BEARING
Arnold Schindel, Fair Lawn, N.J., assignor to The Bendix Corporation, a corporation of Delaware
Filed June 30, 1958, Ser. No. 745,376
4 Claims. (Cl. 308—187.2)

This invention relates to grease-lubricated, prepacket bearings for high speed machinery and more particularly concerns seals for such antifriction bearings which are used in applications where there is high speed rotation of the outer bearing race.

An object of the present invention is to provide an improved sealed bearing which is easily fabricated and assembled and which maintains its seal at inner and outer bearing races. A further object is the provision of a seal which compensates for wear at the inner race. An additional object is to provide an improved seal means which maintains its seal during high speed outer race rotation when centrifuged grease builds up pressure on the outer part of the seal.

The realization of the above objects along with the features and advantages of the present invention will be apparent from the following description and the accompanying drawing in which.

Figure 1:
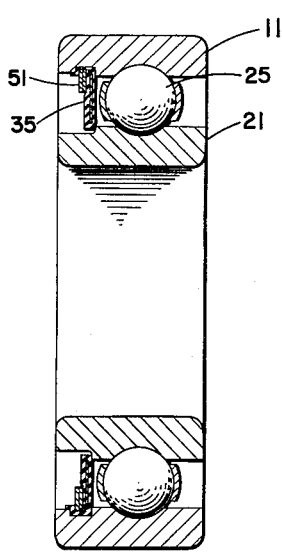
FIG. 1 is a side cross-sectional view of an assembled bearing incorporating the invention.
Figure 2:
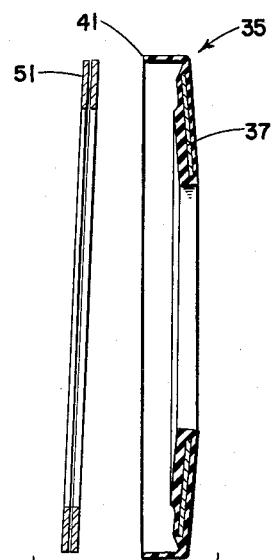
FIG. 2 is side cross-sectional view of a spiral lock washed and an unflexed rubber-coated Belleville washer before assembly in the bearing races.
Figure 3:
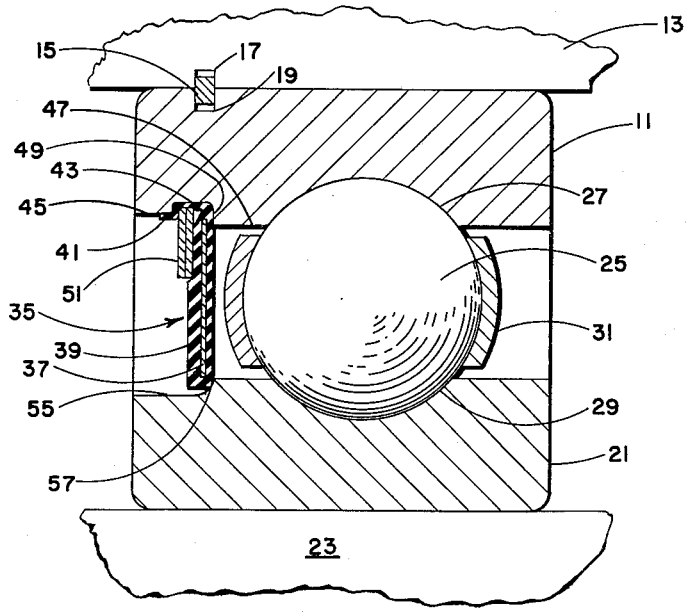
FIG. 3 is an enlarged cross-sectional view of the top of a bearing such as shown in FIG. 1 and shows a flexed rubber-coated Belleville washer or seal retained in the bearing race rings by a spiral lock ring.

In FIGS. 1–3, the bearing outer race 11 and inner race ring 21 with rolling elements or balls 25 provide a bearing which is grease-lubricated during the pre-overhaul life of the associated unit. No relubrication is required provided the seal for the annular lubricant chamber remains effective. From FIG. 1, it is clear that the seal must sealingly contact the inner race 21 and the outer race 11 in order to retain grease and further the seal must not be displaced axially when there is high speed outer race rotation and the grease is centrifuged outward to the outer race ring to exert pressure against the seal. The seal of the present invention provides these functions and is comprised of a rubber-coated deflected Belleville washer 35, a spiral lock ring 51 and associated structure in the race rings 11 and 21. The seal structure is shown only at one side of the bearing in the interest of brevity although it is usually applied to both sides to give a completely sealed bearing. Single application as shown can be used where a pair of spaced bearings are to be sealed at their outer ends.

In FIG. 3, the details of the sealed bearing assembly are shown. The bearing outer race 11 is pressed into an outer rotatable member 13. Race ring 11 is restrained axially by ring 15 mating into groove 17 in rotatable member 13 and a facing groove 19 in outer race ring 11. The inner race ring 21 is supported on stationary shaft 23. Bearing action is provided by balls 25 running in outer and inner raceways 27 and 29. Balls 25 are spaced by a conventional separator 31.

The annular bearing seal 35 is comprised of a metallic Belleville washer 37 around which is molded rubber, rubber-like plastic or a similar material. It is to be noted that the Belleville washer is integral and is free of projections from its inner or outer edges. The rubber 39 adjacent the periphery of the washer is a fairly-heavy, semi-rigid coating, while at the radially outer end of the washer 37 a relatively-thin pliable integral cylindrical sleeve 41 is formed (see FIG. 2). This sleeve 41 extends axially in a direction away from and perpendicular to the transverse plane of the inner edge of washer 37. It is to be noted that the rubber projects radially-inward from the inner edge of the Belleville washer 37. This relatively-thick rigid projection of rectangular cross-section provides a sealing surface which contacts the inner race 21. The coating also has an annular recess radially inwardly of the outer edge of the washer on the axially outer side thereof for receiving multiple turn, spiral lock washer 51.

The outer ring 11 has machined into it an annular groove 43 and a counterbore 45, axially outward of groove 43. The counterbore diameter is smaller than the groove diameter but is larger than the diameter of the inner surface or land 47 of the outer race 11, axially outward of the raceway 27. The Belleville washer 37 has an outer diameter slightly larger than the diameter of the land 47 but smaller than the diameter of the counterbore 45 so that the seal 35 can be installed against shoulder 49 at the junction of groove 43 and land 47. The compressible lock ring 51 has a normal outer diameter essentially equal to or slightly larger than the diameter of the groove 43 so that when positioned on the sleeve in the groove it provides a radial loading on the pliable sleeve 41. The inner diameter of washer 37 is essentially the same as the outer surface of the inner race 21 while the rubber projection has a diameter slightly larger than this inner race surface.

The rubber-coated Belleville washer 35 is deflected and secured against shoulder 49 by the spiral lock ring 51 which has multiple turns and is retained in groove 43 on the rubber sleeve 41. The lock ring 51 in installed position distorts the flexible sleeve 41 to the contour of the groove 43 to provide a seal. It is to be noted that sleeve 41 is thin enough so that the outer diameter of the installed ring 51 is larger than the diameter of counterbore 45. With this arrangement, axial forces due to lubricant pressure acting to displace the seal result in shearing loads on the lock ring 51 due to the reaction of the ring 51 (through the sleeve 41) against the outer shoulder of the groove 43. It is to be noted that the radial dimension of the ring 51 prevents the Belleville washer from deflecting around the ring to assume a truncated conical cross section. Ring 51 overlaps about one-third of the outer part of washer 37.

The inner race ring 21 has machined into it a ledge or reduced land 55 and a curved shoulder or radius 57 which provides an outwardly facing curved surface between land 55 and the inner surface of the inner race 21. In assembling the seal 35, it is pressed against the shoulder 57 due to deflection of the Belleville washer 37. The inner end of the rubber coating provides a seal against the inner race, thereby containing the lubricant at this location. It is to be noted that the inner surface of the groove 43 is opposite the center of the curved shoulder 57 and that the axially inner corner of the rubber of seal 35 contacts the center of the curved shoulder 57. It is apparent that the radial-inner projection or end of seal 35 will be tensioned to move axially inward due to the deflection of the Belleville washer 37. In operation, the sealing of the lubricant at the outer race is provided by the coaction of the pliable sleeve 41 and spiral lock ring 51 at groove 43. The radial outward loading of ring 51 urges the sleeve 41 outward to give sealing action. Any axial forces developed at the outer race, tending to displace the seal 35 axially outward from the groove, are resisted by the outer shoulder of groove 43 at the counterbore 45. This shoulder provides axial restraint to seal 35 through sleeve 41 and the outer edge part of ring 51. Sealing at the inner race ring 21 is provided by the rubber projection of seal 35 contacting the center of curved shoulder 57. The stiffness of the Belleville washer 37 as deflected and constrained by ring 51 prevents displacement of the seal 35 at the inner race shoulder 57.

The rubbing at the shoulder 57 will cause wear but this wear on the inner end of seal 35 is compensated by the Belleville spring loading which will cause the inner end of seal 35 to remain in contact with the shoulder 57. It is apparent that the inner end of the Belleville washer will tend to move inwardly so that it can assume a truncated conical cross section (as seen in FIG. 2). It is to be noted that, during high speed outer race rotation, centrifugal loads on the spiral ring 51 result in hoop tension on the distortable sleeve 41 and hence improved sealing action during this more severe operating condition.

It is to be understood that persons skilled in the art can make change in the disclosed embodiment of the invention without departing from the invention as set forth in the appended claims.

What is claimed is:

1. In a bearing assembly having an annular groove in the inner surface of an outer race facing the shoulder of a reduced land in the outer surface of the inner race, the seal improvement comprised of a deflected metallic Belleville washer having a rubber coating and extending from the groove to the shoulder, said coating extending over the bottom of said groove and contacting said shoulder, means anchored in said groove constructed and arranged so that said Belleville washer is held in deflected position and so that axial loading on the radially-outer part of said washer will be offset, said Belleville washer being constructed and arranged so that as deflected its inner edge is tensioned against said shoulder, said means also exerting a radially outward force on said coating in the bottom of said groove.

2. An antifriction bearing comprised of a pair of cooperating race rings with rolling elements between them, the outer one of said race rings having a groove opening toward the inner one of said race rings, the inner race ring having a ledge facing said groove, said ledge being terminated by a radially-extending shoulder, said outer race ring having counterbore from its edge to said groove, said counterbore having a diameter smaller than the groove but larger than the inner diameter of the outer race ring, a seal extending between said groove and said ledge, said seal including a metallic Belleville washer having a rubber-like coating, said coating extending radially-inwardly from the inner edge of said washer as a relatively thick rigid projection, said coating extending radially-outwardly from the outer edge of said washer as a thin pliable sleeve, said coating projection contacting said shoulder, said sleeve fitting along the surface of said groove, a multiple turn spiral lock ring arranged at the outer part of said seal and on said sleeve so that said Belleville washer is flexed flat and the coated inner edge of said washer is tensioned in an inward direction against said shoulder, said Belleville washer having an outer diameter larger than the inner diameter of the outer race ring but smaller than the diameter of said counterbore, said spiral lock ring having a normal outer diameter in relation to the diameter of said groove so that said lock ring radially loads said flexible sleeve in said groove and is axially restrained by the outer edge of said groove, the inner diameter of said lock ring being such that said lock ring as positioned radially overlaps about one-third of the outer part of said washer, said coating on said washer having an annular recess at the outer end of said washer for receiving the radially-inner part of said lock ring.

3. In a bearing assembly having an annular groove in the inner surface of an outer race facing the shoulder of a reduced land in the outer surface of the inner race, the seal improvement comprised of a deflected metallic Belleville washer having a rubber coating and extending from the groove to the shoulder, said coating extending over the bottom of said groove and contacting said shoulder, means anchored in said groove constructed and arranged so that said Belleville washer is held in deflected position and so that axial loading on the radially-outer part of said washer will be offset, said Belleville washer being constructed and arranged so that as deflected its inner edge is tensioned against said shoulder, said means also exerting a radially outward force on said coating in the bottom of said groove, said means being a multiple-turn spiral lock washer, said inner surface of said outer race having a counterbore extending outwardly from said groove to the edge of said outer race, said counterbore having a diameter slightly larger than the outer diameter of said metallic Belleville washer.

4. An annular sealing ring for closing the end of an annular lubricant chamber comprised of a deflectible metallic Belleville washer of truncated conical cross-section and having an outer edge and an inner edge, said Belleville washer being integral and free of projections from said outer edge or said inner edge, a rubber coating molded on and encasing said washer, said coating extending slightly beyond the inner edge of said washer to form a relatively thick rigid annular projection, said coating extending beyond the outer edge of said washer and forming a thin pliable cylindrical sleeve, said cylindrical sleeve extending axially from adjacent said outer edge of said Belleville washer and in a direction away from the transverse plane through said inner edge of said Belleville washer.

References Cited in the file of this patent

UNITED STATES PATENTS

| | | |
|---|---|---|
| 2,221,554 | Okun | Nov. 12, 1940 |
| 2,481,430 | Koller | Sept. 6, 1949 |
| 2,584,227 | Patter | Feb. 5, 1952 |
| 2,701,732 | Van Dorn | Feb. 8, 1955 |
| 2,755,113 | Baumheckel | July 17, 1956 |
| 2,764,433 | Cobb | Sept. 25, 1956 |

FOREIGN PATENTS

| | | |
|---|---|---|
| 580,435 | Great Britain | Sept. 6, 1946 |